United States Patent
Wahlquist (10) Patent No.: US 9,661,973 B2
(45) Date of Patent: May 30, 2017

(54) CLEANING PAD WITH ABRASIVE LAYER

(71) Applicant: Rockline Industries, Inc., Sheboygan, WI (US)

(72) Inventor: Joseph D. Wahlquist, Sheboygan, WI (US)

(73) Assignee: Rockline Industries, Inc., Sheboygan, WI (US)

( * ) Notice: Subject to any disclaimer, the term of this patent is extended or adjusted under 35 U.S.C. 154(b) by 898 days.

(21) Appl. No.: 13/837,180

(22) Filed: Mar. 15, 2013

(65) Prior Publication Data

US 2014/0259496 A1   Sep. 18, 2014

(51) Int. Cl.

| | |
|---|---|
| *A47L 13/16* | (2006.01) |
| *A47L 13/44* | (2006.01) |
| *A47L 13/256* | (2006.01) |
| *B32B 5/26* | (2006.01) |
| *B32B 5/02* | (2006.01) |
| *B32B 5/24* | (2006.01) |

(52) U.S. Cl.
CPC ............ *A47L 13/16* (2013.01); *A47L 13/256* (2013.01); *A47L 13/44* (2013.01); *B32B 5/022* (2013.01); *B32B 5/245* (2013.01); *B32B 5/26* (2013.01); *B32B 2262/0253* (2013.01); *B32B 2262/062* (2013.01); *B32B 2262/067* (2013.01); *B32B 2307/554* (2013.01); *B32B 2307/584* (2013.01); *B32B 2307/726* (2013.01); *B32B 2432/00* (2013.01)

(58) Field of Classification Search
CPC ........ A47L 13/16; A47L 13/44; A47L 13/256; B32B 5/245; B32B 5/26
See application file for complete search history.

(56) References Cited

U.S. PATENT DOCUMENTS

| | | | |
|---|---|---|---|
| 4,031,673 A * | 6/1977 | Hagelberg | A47K 11/10 15/104.94 |
| 5,591,507 A * | 1/1997 | Jones | A47L 13/16 15/114 |
| 6,716,805 B1 | 4/2004 | Sherry et al. | |
| 6,936,580 B2 | 8/2005 | Sherry et al. | |
| 6,996,871 B1 * | 2/2006 | Policicchio | A47L 13/256 15/209.1 |
| 7,094,741 B2 | 8/2006 | Barnabas et al. | |
| D551,409 S | 9/2007 | Pung et al. | |
| 7,480,956 B2 * | 1/2009 | Policicchio | A47L 13/16 134/6 |
| D649,310 S | 11/2011 | Colangelo | |
| D649,311 S | 11/2011 | Colangelo | |
| 8,250,700 B2 | 8/2012 | Pung et al. | |
| D673,745 S | 1/2013 | Pung et al. | |
| 8,776,300 B2 * | 7/2014 | Colangelo | A47L 13/16 15/104.93 |
| 2005/0055791 A1* | 3/2005 | Lin | A47L 13/256 15/228 |
| 2006/0168750 A1* | 8/2006 | Dotterman | A47L 13/12 15/228 |
| 2009/0301601 A1 | 12/2009 | Enerson et al. | |

* cited by examiner

*Primary Examiner* — Randall Chin (74) *Attorney, Agent, or Firm* — Reinhart Boerner Van Deuren P.C.

(57) ABSTRACT

A cleaning pad is provided. The cleaning pad includes a cover layer, a core, and an attachment layer. The core is located between the cover layer and the attachment layer. A porous abrasive substance is applied to the attachment layer.

11 Claims, 8 Drawing Sheets

CLEANING PAD WITH ABRASIVE LAYER

BACKGROUND OF THE INVENTION

Field of the Invention

This invention relates generally to nonwoven cleaning pads, and more particularly to cleaning pads with multiple layers.

There are disposable pads designed to be used in conjunction with a reusable handle and mop head. When mopping, occasionally dirt and/or contaminants may be encountered that are difficult to remove. One pad provides a strip of thermoplastic film attached to the absorbent pad.

The subject matter discussed in this background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

SUMMARY OF THE INVENTION

One embodiment of the invention relates to a cleaning pad. The cleaning pad includes a cover layer. The cleaning pad includes a core. The cleaning pad includes an attachment layer. The attachment layer has a first side and a second side. The attachment layer has a core located between the cover layer and the second side of the attachment layer. The cover layer is coupled to the attachment layer. The attachment layer includes wing portions extending from the portions of the attachment layer coupled to the cover layer to a periphery of the attachment layer. The pad includes a porous abrasive substance applied to generally all of the second side of each of the wing portions of the attachment layer.

Another embodiment of the invention relates to a method of making a cleaning pad. The method includes providing an attachment layer having a first side and a second side. The method includes applying an abrasive substance to the first side of the attachment layer. The abrasive substance allows absorption of a liquid past the abrasive substance and into the attachment layer. The method includes providing a core. The method includes providing a cover layer. The method includes coupling the cover layer to the attachment layer, with the core located between the cover layer and the attachment layer.

Another embodiment of the invention relates to a cleaning pad. The cleaning pad includes a nonwoven attachment layer. The attachment layer has a first surface and a second surface opposite the first surface. The first surface of the attachment layer is liquid permeable and abrasive. The cleaning pad includes a core. The cleaning pad includes a cover layer. The core is located between the cove layer and the first surface of the attachment layer. The cover layer is coupled to the attachment layer.

Another embodiment of the invention relates to a cleaning pad. The cleaning pad includes a cover layer. The cleaning pad includes a core. The cleaning pad includes an attachment layer. The attachment layer has a first side and a second side. The first side of the attachment layer has an area. A substance is coupled to at least approximately 50% of the area of the first side. The at least approximately 50% of the area of the first side is liquid permeable and abrasive. The core is located between the cover layer and the second side of the attachment layer. The cover layer is coupled to the attachment layer.

Alternative exemplary embodiments relate to other features and combinations of features as may be generally recited in the claims.

DESCRIPTION OF THE DRAWINGS

This application will become more fully understood from the following detailed description, taken in conjunction with the accompanying figures, wherein like reference numerals refer to like elements in which.

DETAILED DESCRIPTION OF THE EXEMPLARY EMBODIMENTS

Before turning to the Figures, generally embodiments of cleaning pads are provided. Disposable pads, such as pads presaturated with liquid, may be coupled to mop heads of reusable mops. Then, when a pad becomes spent (e.g., dirty, saturated with contaminants, dry, etc.) the pad may be removed from the mop head, discarded, and replaced with another disposable pad.

When mopping, occasionally dirt and/or contaminants may be encountered that are difficult to remove from the floor and/or worksurface. Embodiments of multi-layer pads are provided configured to provide for removal of difficult to remove dirt and/or contaminants. Porous, abrasive substances are applied to at least one of the layers of the pad. The portion of the layer including the porous, abrasive substance may be used to move difficult to remove dirt and/or contaminants, e.g., mechanically abrade dirt and/or contaminants such that the dirt and/or contaminants are no longer adhered to the floor and/or worksurface.

Figure 1:
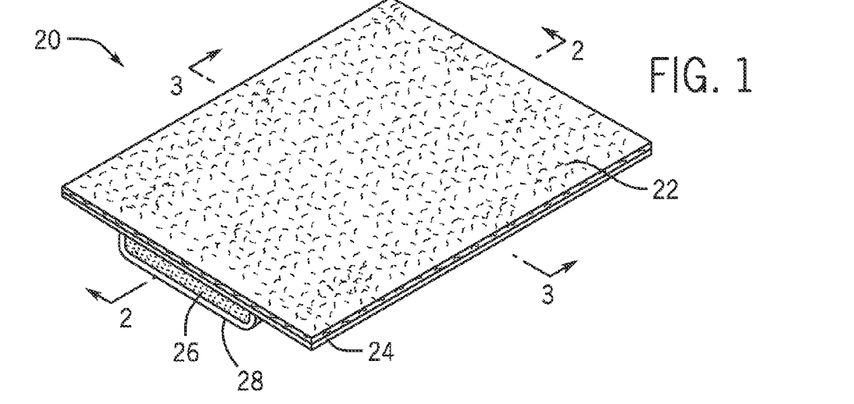
FIG. 1 is a top perspective view of an embodiment of a cleaning pad.

With reference to FIG. 1, an embodiment of a cleaning pad 20 is illustrated. The cleaning pad 20 includes an attachment layer 22, a core 26, and a cover layer 28. The core 26 is located between the attachment layer 22 and the cover layer 28.

Figure 2:
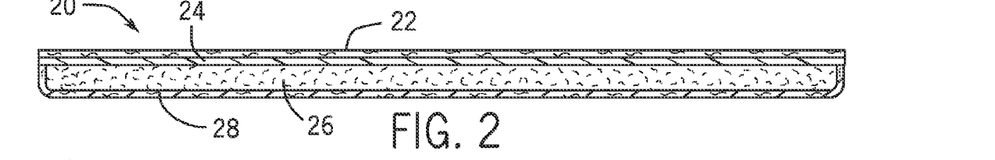
FIG. 2 is a cross-sectional view taken along the line 2-2 in FIG. 1.
Figure 3:
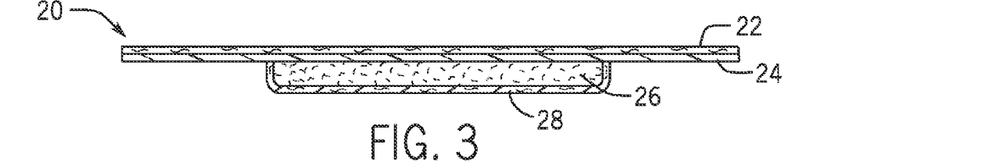
FIG. 3 is a cross-sectional view taken along the line 3-3 in FIG. 1.

As illustrated in FIGS. 1-3, in one embodiment, a porous abrasive substance 24 is applied to one side of the attachment layer 22. The attachment layer 22 with the porous abrasive substance 24 applied may be hard enough to mechanically abrade difficult to remove dirt and/or contaminants, e.g., dried on stains, etc., but soft enough to prevent scratching of flooring surfaces and/or work surfaces when mechanically abrading difficult to remove dirt and/or contaminants from a floor surfaces and/or work surface.

In one embodiment, the substance 24 is applied over the majority (e.g., at least approximately 51%, etc.) of one side of the attachment layer 22. In another embodiment, the substance 24 is applied to between approximately 30% and approximately 90% of one side of the attachment layer 22. In another embodiment, the substance 24 is applied to between approximately 25% and approximately 100% of one side of the attachment layer 22, more preferably, between approximately 50% and approximately 90% of one side of the attachment layer 22. In another embodiment, the substance 24 is applied to substantially all of one side of the attachment layer 22. In one embodiment, the substance 24 is coupled to the attachment layer 22 without adhesive. In one embodiment, the substance 24 is bonded to the attachment layer 22.

In one embodiment, the attachment layer 22 is a nonwoven material formed, for example, by hydroentangling, spunbonding, meltblowing, thermal bonding, through air bonding, needlepunching, adhesive bonding, etc., from fibers such as, for example, polypropylene, polyethylene, polyethylene terephthalate (PET), Rayon, Lyocell, cotton, pulp, etc. In one embodiment, fibers of the attachment layer 22 are between approximately 0.001 denier and approximately 2 denier. In another embodiment, fibers of the attachment layer 22 are approximately 1.5 denier. In another embodiment, fibers of the attachment layer 22 are approximately 0.1 denier.

In one embodiment, the substance 24 includes stiff fibers between approximately 2 denier to approximately 200 denier, e.g., fibers substantially larger, e.g., at least approximately 50% larger, etc., than fibers forming the attachment layer 22. In one embodiment, the relatively large, stiff fibers are, e.g., hydroentangled with the fibers of the attachment layer 22, spunlaced with the fibers of the attachment layer 22, coupled to the attachment layer 22, thermally fused to the attachment layer 22, etc. In other embodiments, the relatively large, stiff fibers may be thermally calendar bonded to the attachment layer 22, ultrasonically bonded to the attachment layer, bonded with adhesive to the attachment layer 22, etc. In another embodiment, the substance 24 includes irregularly-shaped polymer globules. The globules are applied, e.g., blown on, printed on, etc., the attachment layer 22 and bonded thereto.

In another embodiment, the substance 24 includes bicomponent fibers. In one embodiment, the bicomponent fibers include two polymers contained within the same filament. In one embodiment, one of the polymers may be polyethylene (PE) while the other polymer may be polypropylene (PP). In another embodiment, one of the polymers may be PE while the other polymer may be PET. In another embodiment, one of the polymers may be Co-PET while the other polymer may be PET. In another embodiment, one of the polymers may be PP while the other polymer may be PET. In one embodiment, one of the polymers has a different melting point than the other polymer. In one embodiment, the bicomponent fibers may be applied to attachment layer and coupled thereto by heating, e.g., in one embodiment the sheath of the fibers of the bicomponent fibers has a lower melting point that the core of the bicomponent fibers, therefore, when heat is applied, the sheath may melt, creating bonding points with adjacent bicomponent fibers and/or fibers of the attachment layer.

In another embodiment, the substance 24 includes thermoplastic fibers. The thermoplastic fibers are applied to and coupled to the attachment layer 22 by, for example, flame impingement treatment.

In another embodiment, the substance 24 includes powder bonding resin. In one embodiment, the powder bonding resin is thermoplastic bonding resin. In one embodiment, the powder bonding resin has a lower melting point than the attachment layer. In one embodiment, the power bonding resin is applied to the attachment layer 22 and melted, coupling the powder bonding resin to the attachment layer 22 and forming a raised, abrasive texture on the attachment layer 22.

In another embodiment, the substance 24 includes hard polymeric compounds that are printed on, e.g., in a pattern of lines or dots, etc., the attachment layer 22.

The substance 24 is configured such that portions of attachment layer 22 with the substance 24 applied thereto allow squeeze out of the attachment layer 22 with fluid squeezed out from the attachment layer 22 passing through and out from the portions of the attachment layer 22 including the substance 24. This may be in contrast to, for example, an attachment layer with a thermoplastic strip applied, which thermoplastic strip would prevent squeeze out and fluid exit therethrough.

In one embodiment, substance 24 is configured such that fluid may be absorbed by the attachment layer 22 through the portion of the attachment layer 22 to which the substance 24 is applied, e.g., the portion of the attachment layer 22 to which the substance 24 is applied is fluid permeable, etc. This may be in contrast to, for example, an attachment layer with a thermoplastic strip applied, which thermoplastic strip would prevent absorption therethrough.

In one embodiment, the core 26 is formed from a nonwoven, absorbent fibrous media, such as, for example, air laid-type (e.g., multi-bonded air laid, thermal bonded air laid, hydrogen bonded air laid, etc.) material, spunlace material, meltblown material, needlepunch-type material, etc. In one embodiment, the core 26 has an absorbent capillary structure. In various embodiments, the core 26 may be formed from wood pulp, bicomponent fibers, polyester, polypropylene, viscose, Lyocell, cotton, etc. In another embodiment, the core 26 includes an open cell foam. In one embodiment, the foam is formed from cellulose. In another embodiment, the foam is formed from a synthetic polymer or combination of synthetic polymers.

In one embodiment, the cover layer 28 includes a nonwoven, porous, fibrous media, such as a media that resists abrasion and pilling during mopping. In one embodiment, the cover layer 28 includes between approximately 20% and approximately 50% of a hydrophilic fiber, e.g., viscose, wood pulp, wettable polyester, etc. In one embodiment, the hydrophilic fiber may facilitate uniform distribution of liquid during mopping.

With further reference to FIG. 1, the cover layer 28 is coupled to the attachment layer 22, e.g., by heat staking, adhesive, ultrasonic, thermal bonding, mechanical embossing, stitching, etc., holding the core 26 and the cover layer 28 to the attachment layer 22. In one embodiment, the core 26 is coupled to the attachment layer 22. In another embodiment, the core 26 is attached direct to the attachment layer 22, e.g., not adhered to, etc., but is located relative to the attachment layer 22 by the cover layer 28. In one embodiment, the core 26 is coupled to the cover layer 28. In another embodiment, the core 26 is not attached directly to the cover layer 28, but is held between the cover layer 28 and the attachment layer 22.

Figure 4:
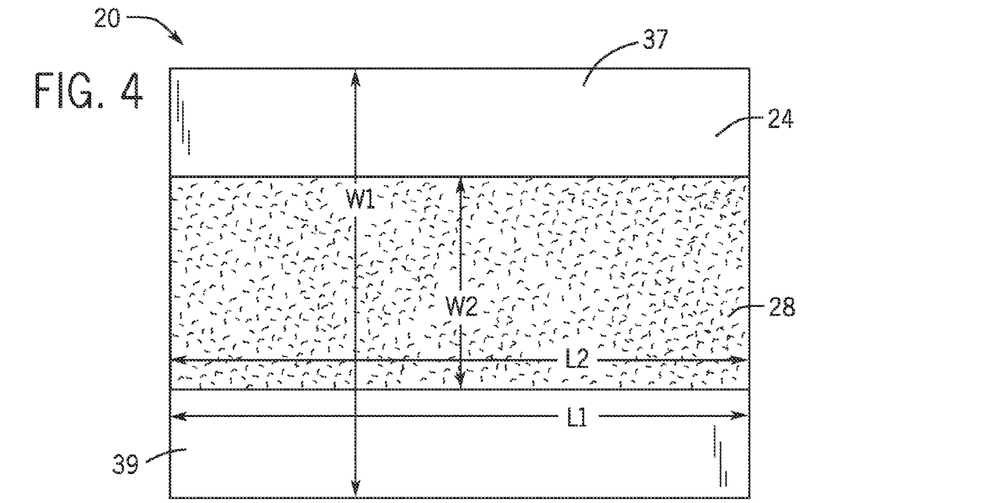
FIG. 4 is a plan view of an embodiment of a pad.

With reference to FIGS. 2-4, the attachment layer 22 extends a first length L1. The core 26 and the cover layer 28 extend a second length L2. In one embodiment, length L1 and length L2 are generally the same. The attachment layer 22 extends a first width W1. The cover layer 28 extends a second width W2. In one embodiment, the width W1 is greater than the width W2. As is illustrated in FIGS. 3 and 4, on either side of the cover layer 28 are portions of the attachment layer 22 with the substance 24 applied thereto. In one embodiment, the substance 24 is applied over substantially all of the portions of the attachment layer 22 not covered by the core 26 or the cover layer 28.

In one embodiment, the width W1 is approximately 220 millimeters (mm). In one embodiment, the length L1 is approximately 260 mm. In one embodiment, the width W2 is approximately 120 mm. In one embodiment, the core 26 extends in the direction of W2 approximately 100 mm.

Figure 5:
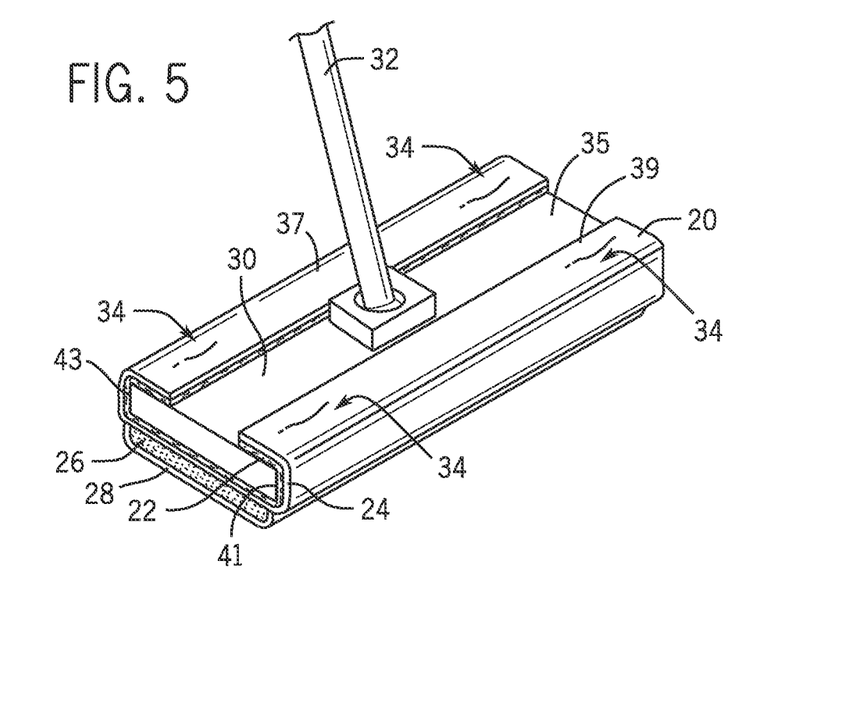
FIG. 5 is a perspective view of an embodiment of a pad coupled to a mop head.
Figure 6:
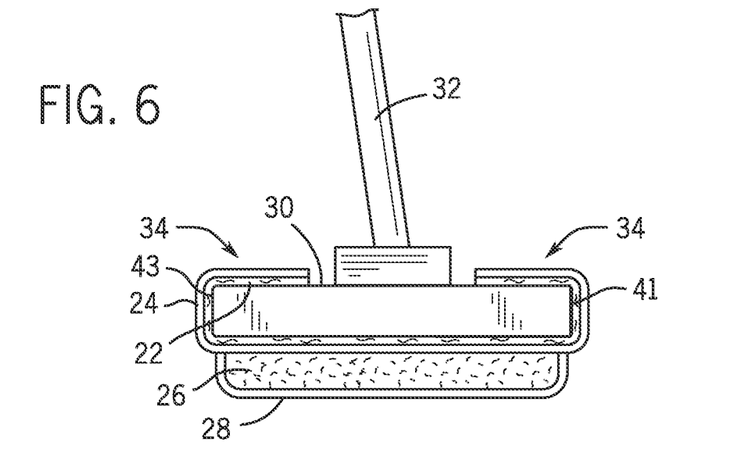
FIG. 6 is a side view of the pad coupled to the mop head of FIG. 5.

In one embodiment, a mop including a mop head 30 and a handle 32 is provided. The mop head 30 includes features, such as, e.g., recesses 34, configured to couple the pad 20. As is illustrated in FIG. 5, the mop pad 20 is configured with the wings 37 and 39 of the attachment layer 22 wrapped around the mop head 30 and coupled to the top surface 35 of the mop head 30. The side of the attachment layer 22 with the substance 24 applied thereto is exposed on the sides 41 and 43 and portions of the top surface 35 of the mop head 30. The pad 20 is configured on the mop head 30 such that a user encountering a contaminant that is difficult to remove from a floor or worksurface may position the mop head 30 on its side 41 or 43 or top 30 to apply the portion of the attachment layer 22 with the substance 24 applied thereto to the floor or worksurface to abrade the contaminant and release the contaminant from the floor or worksurface. The substance 24 being applied over a large portion of the wings 37 and 39 of the attachment layer may provide for an increased available surface area to be applied to the floor or worksurface, e.g., as compared to a thin strip of thermoplastic, etc. Additionally, when the mop head 30 is placed flat, e.g. with the bottom surface, opposite the top surface 35, contacting the floor or worksurface, on the floor or worksurface, the mop may be used without the portion of the attachment layer 22 with the substance 24 applied thereto in contact with the floor or worksurface.

In one embodiment, the substance 24 is applied to the wings 37 and 39. In one embodiment, the wings 37 and 39 have a large area, e.g., relative to a thin thermoplastic strip, for example, which may allow for a user to apply the abrasive, porous wings with the substance 24 applied thereto easily to a floor and/or worksurface to abrade difficult to remove contaminants, to provide greater contact area, e.g., relative to a thin thermoplastic strip, for example, with a floor and/or worksurface, and to contact of a floor and/or worksurface over a wide variety of alignments and/or configurations of a mop head with a floor and/or worksurface.

In one embodiment, the substance 24 is a different color than the cover layer 28 and/or the core 26.

Figure 7:
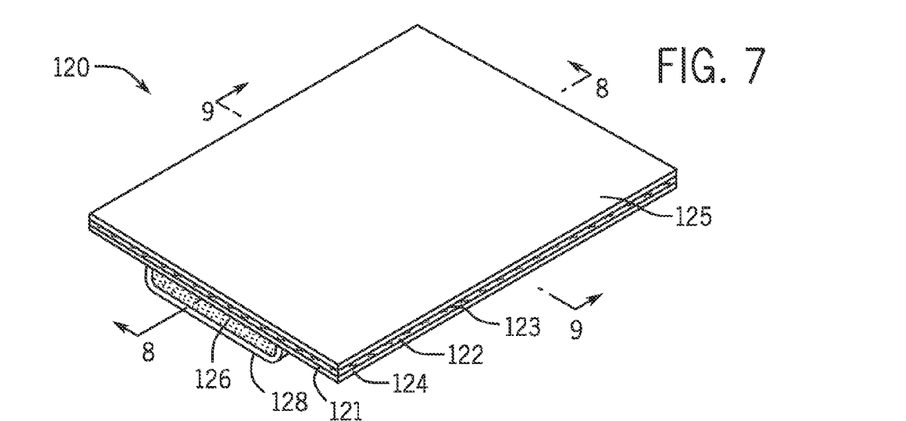
FIG. 7 is a top perspective view of another embodiment of a pad.
Figure 7A:
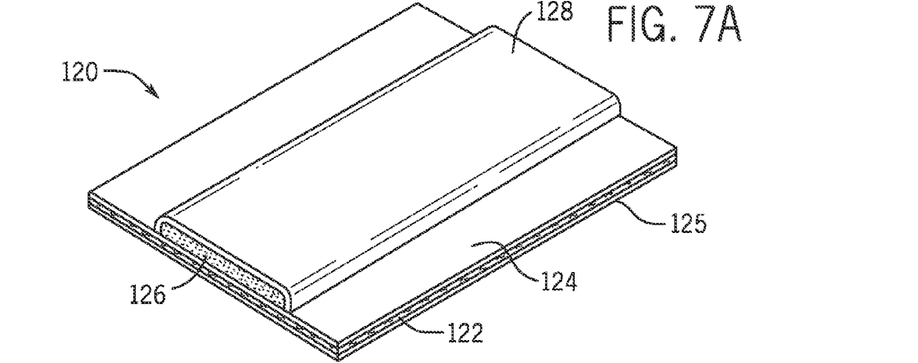
FIG. 7A is a bottom perspective view of the pad of FIG. 7.
Figure 8:
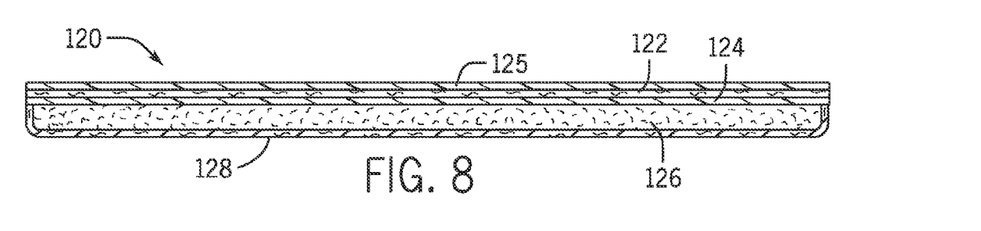
FIG. 8 is a cross-sectional view taken along the line 8-8 in FIG. 7.
Figure 9:
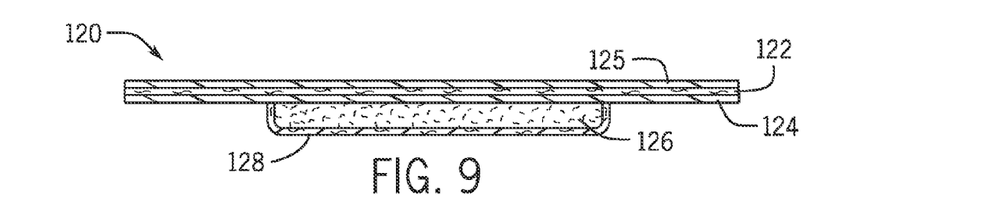
FIG. 9 is a cross-sectional view taken along the line 9-9 in FIG. 7.
Figure 10:
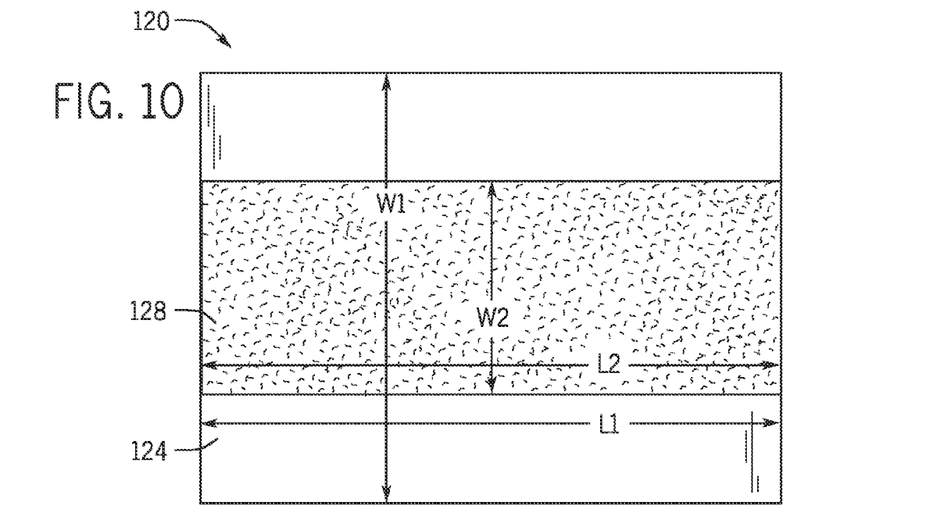
FIG. 10 is a plan view of an embodiment of a pad.

With reference to FIG. 7, another embodiment of a mop pad 120 is provided. The mop pad 120 has various similarities to the previously described mop pad 20. Therefore, differences between the mop pad 120 and the mop pad 20 are focused on in the description below. The mop pad 120 includes an attachment layer 122, a core 126 and a cover layer 128. The core 126 is located between the attachment layer 122 and the cover layer 128.

In the embodiment illustrated in FIG. 7, applied to the second side 123 of the attachment layer 122 opposite the first side 121 is a second porous abrasive substance 125. In one embodiment, substance 125 is generally the same as the substance 124 applied to the first side 121 of the attachment layer 122. In another embodiment, the substance 125 is different, e.g., has different properties, such as grit levels, abrasion levels, etc., from the substance 124. As with the substance 24 of the previous embodiment, the porous abrasive substance 125 applied may be hard enough to mechanically abrade difficult to remove dirt and/or contaminants, e.g., dried on stains, etc., but soft enough to prevent scratching of flooring surfaces and/or work surfaces when mechanically abrading difficult to remove dirt and/or contaminants from a floor surfaces and/or work surface.

In one embodiment, the substance 125 is applied over the majority (e.g., at least approximately 51%, etc.) of the second side 123 of the attachment layer 122. In another embodiment, the substance 125 is applied to between approximately 25% and approximately 100% of the second side 123 of the attachment layer 122, and more preferably between approximately 50% and approximately 90% of the second side 123 of the attachment layer. In another embodiment, the substance 125 is applied to between approximately 30% and approximately 90% of the second side 123 of the attachment layer 122. In another embodiment, the substance 125 is applied to substantially all of the second side 123 of the attachment layer 122. In one embodiment, the substance 125 is coupled to the attachment layer 122 without adhesive. In one embodiment, the substance 125 is bonded to the attachment layer 122. In various embodiments, the substance 125 may be similar materials applied and coupled to the attachment layer 122 in any of the examples described with regarding to the substance 24 above.

Figures 11, 12:
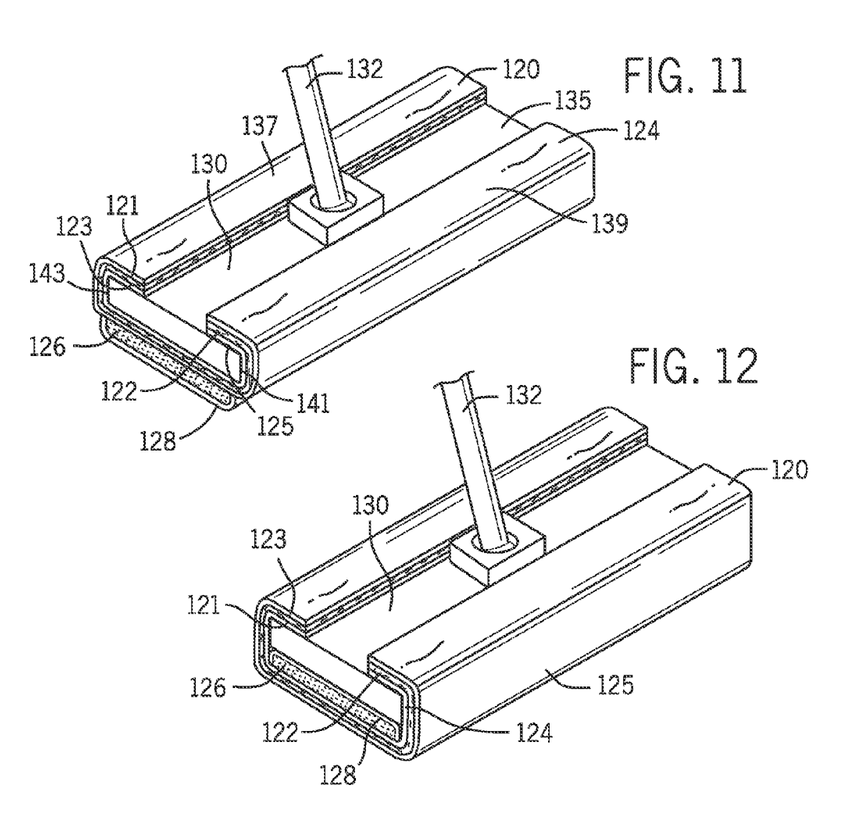
FIG. 11 is a perspective view of an embodiment of a pad coupled to a mop head.
FIG. 12 is a perspective view of the pad of FIG. 11 with the opposite side of the pad coupled to a mop head.

With reference to FIG. 11, the cleaning pad 120 is configured to be coupled to a mop head 130. The cleaning pad 120 is shown in FIG. 11 with the second side 123 of the attachment layer 122 proximate the mop head 130. The cover layer 128 is configured to be applied to a floor or worksurface. As in the previous embodiment, the first side 121 of the wing portions 137 and 139 with the substance 124 applied thereto is located proximate the sides 141 and 143 and the top surface 135 of the mop head 130. The mop head 130 may be configured with one side 141 or 143 or top surface 135 proximate the floor or worksurface to apply the portions of the first side 121 with the substance 124 applied thereto to the floor or worksurface.

Additionally, with reference to FIG. 12, the cleaning pad 120 may be turned over and reattached to the mop head 130. In this configuration, the entire second surface 123 of the attachment layer 122 with the substance 124 applied thereto is exposed for application to a floor or worksurface.

Figure 13:
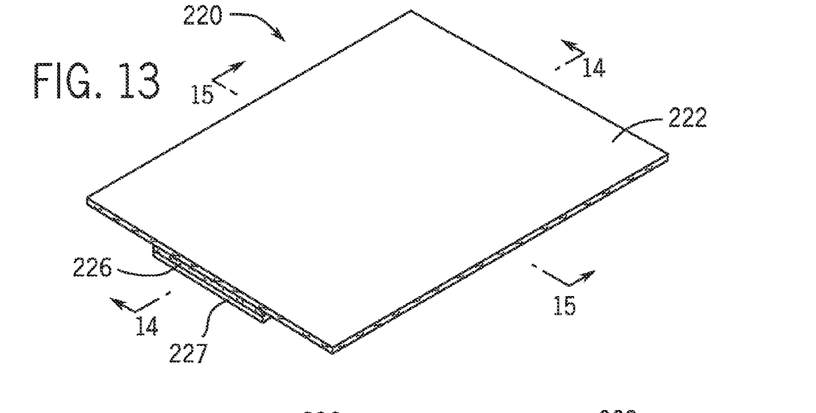
FIG. 13 is a top perspective view of another embodiment of a pad.

With reference to FIG. 13, another embodiment of a cleaning pad 220 is illustrated. The cleaning pad 220 includes an attachment layer 222. Coupled to the attachment layer 222 is a core 226. In one embodiment, the core 226 includes a heavy weight needle punched fabric. In another embodiment, the core 226 includes an airlaid web. In another embodiment, the core 226 includes a spunlace web.

In the illustrated embodiment, an abrasive porous substance 227 is applied to the core 226 on a side of the core 226 opposite the attachment layer 222. In one embodiment, the substance 227 is a stable abrasive substance applied to the core 226 by a flame impingement treatment. In another embodiment, the substance 227 is a high concentration of melted bicomponent fibers coupled to the core 226. The components of the bicomponent fibers have different melting points. The core 226 with the bicomponent fibers is heated, melting one of the components of the bicomponent fibers and forming a porous abrasive surface of the core 226.

Figure 14:
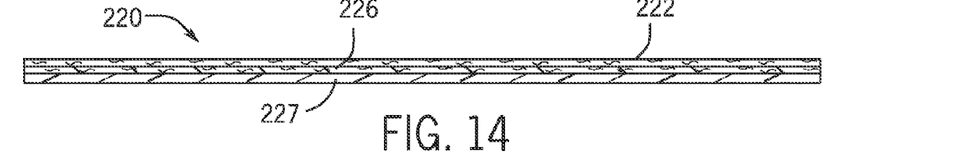
FIG. 14 is a cross-sectional view taken along the line 14-14 in FIG. 13.
Figure 15:
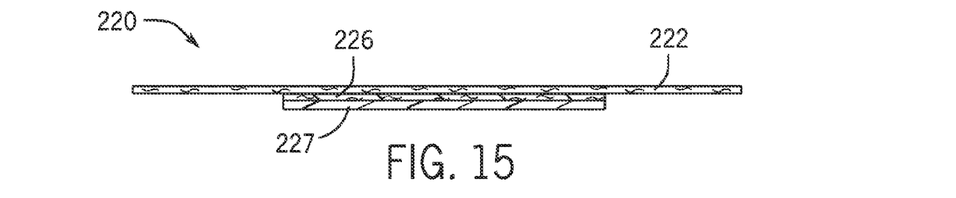
FIG. 15 is a cross-sectional view taken along the line 15-15 in FIG. 13.
Figure 16:
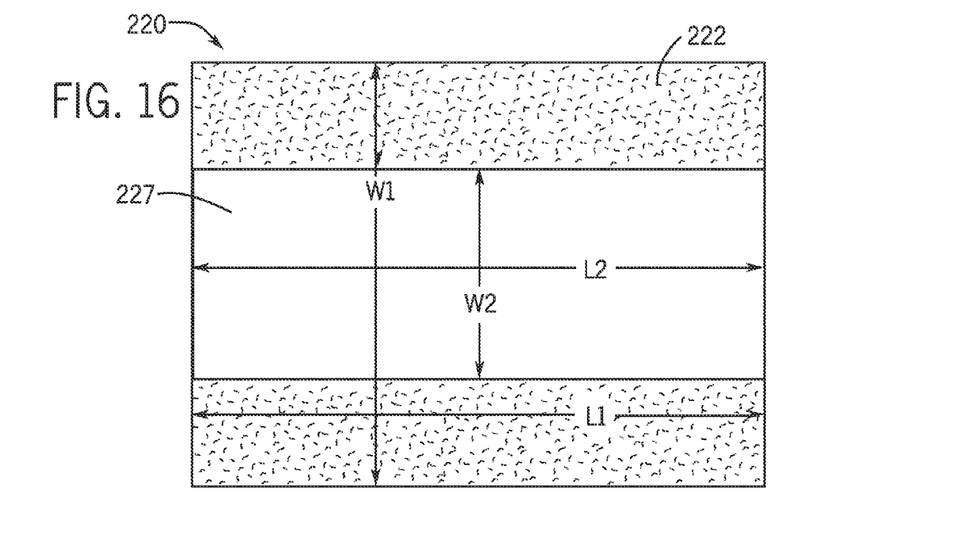
FIG. 16 is a plan view of an embodiment of a pad.

With reference to FIGS. 14-16, in one embodiment, the substance 227 is applied to generally all of the side of the core 226 opposite the attachment layer. The attachment layer 222 extends a length L3. The surface of the core 226 to which the substance 227 is applied extends a length L4. In one embodiment the length L3 is generally equal to the length L4. The attachment layer 222 extends a width W3. The surface of the core 226 extends a width W4. In one embodiment, the width W3 is generally greater than the width W4.

As is illustrated in FIGS. 14-16, the cleaning pad 220 is configured such that the surface of the cleaning pad 220 including the substance 227 may be applied to the floor to abrade difficult to remove contaminants from a floor or worksurface without turning a mop head on its side or top surface.

Figure 17:
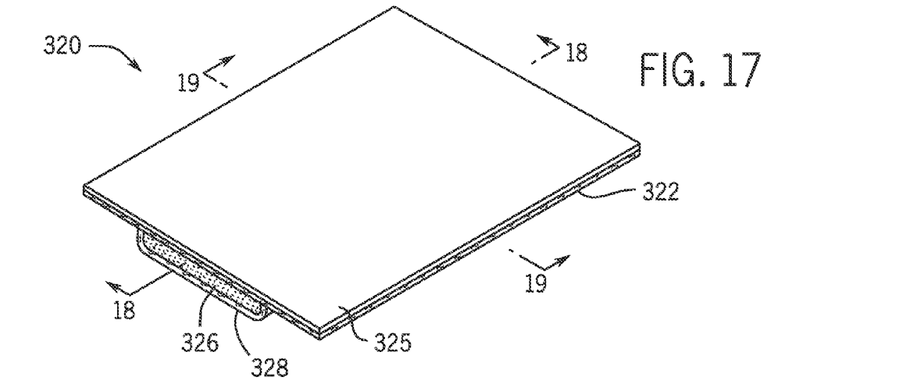
FIG. 17 is a top perspective view of another embodiment of a pad.
Figure 18:
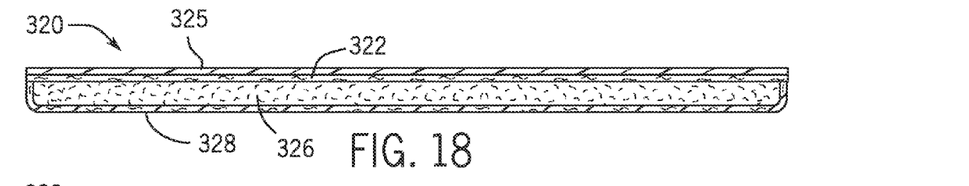
FIG. 18 is a cross-sectional view taken along the line 18-18 in FIG. 17.
Figure 19:
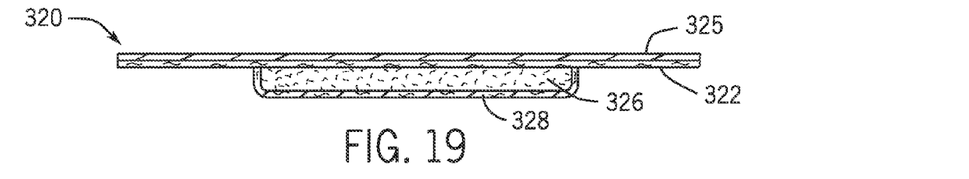
FIG. 19 is a cross-sectional view taken along the line 19-19 in FIG. 17.
Figure 20:
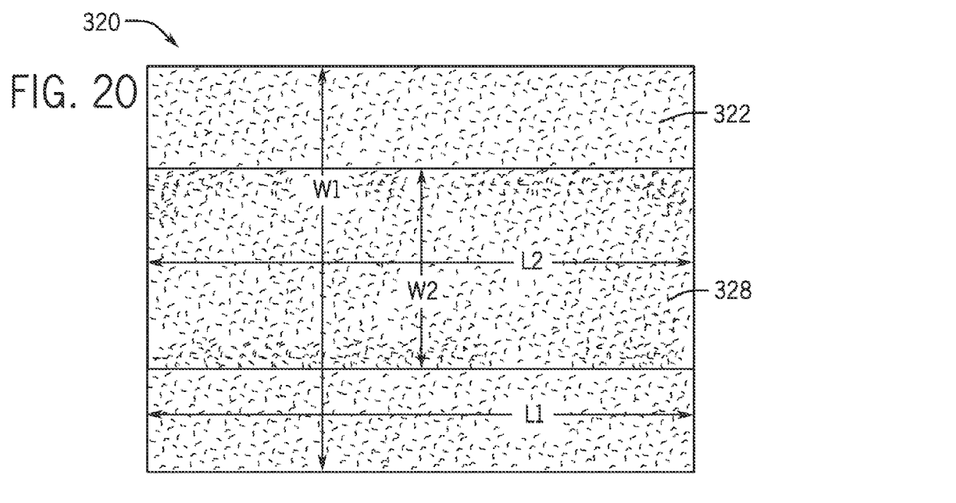
FIG. 20 is a plan view of an embodiment of a pad.
Figure 21:
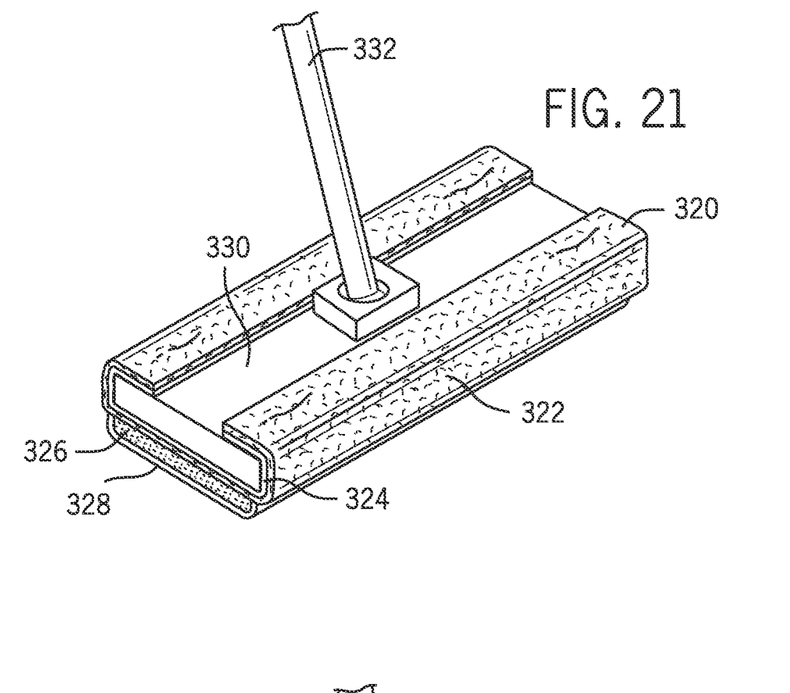
FIG. 21 is a perspective view of an embodiment of a pad coupled to a mop head.
Figure 22:
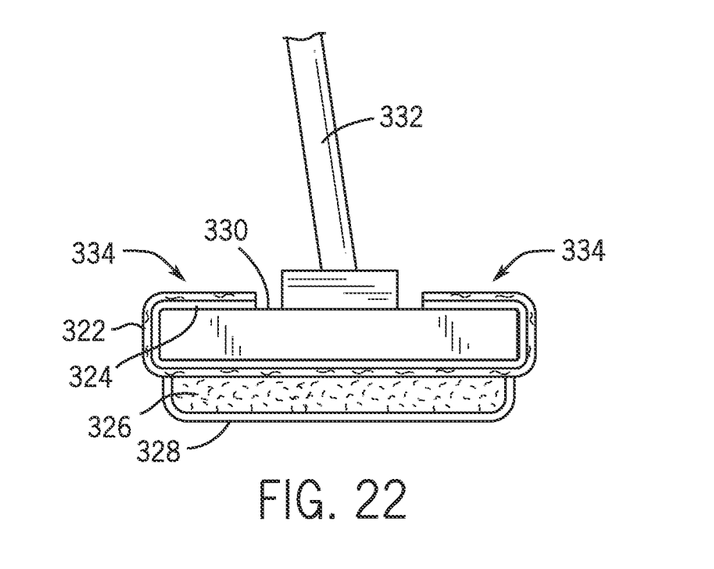
FIG. 22 is a side view of the pad of FIG. 21 coupled to a mop head.

With reference to FIG. 17, another embodiment of a cleaning pad 320 is illustrated. The cleaning pad 320 includes an attachment layer. As in the embodiment of a cleaning pad 120 illustrated in FIG. 7, the cleaning pad 320 includes a porous abrasive substance 325 applied to generally all of the surface of the attachment layer 322 opposite the core 326. However, unlike the cleaning pad 120 illustrated in FIG. 7, the cleaning pad 320 does not have an abrasive porous substance applied to the surface of the attachment layer 322 proximate the core 326. The cleaning pad 320 is configured to be coupled to a mop head in a first configuration (see FIGS. 21 and 22) in which generally none of the surface of the cleaning pad 320 with the porous abrasive substance 325 may be applied to a floor or worksurface, or a second configuration, with the cleaning pad 320 turned over relative to the first configuration, with the surface of the attachment layer 222 with the porous abrasive substance 325 configured to be placed in contact with a worksurface over the bottom, sides, and top surface of a mop head.

Figure 23:
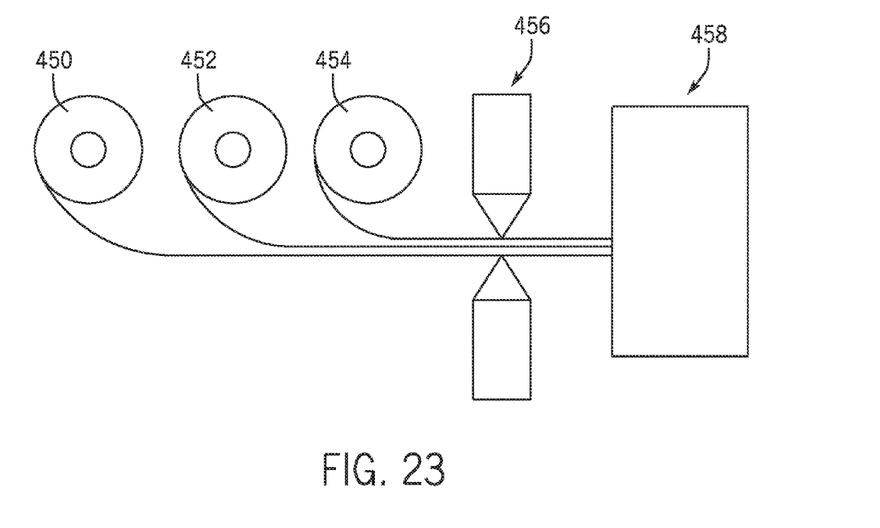
FIG. 23 is a schematic illustration of an embodiment of a method and mechanism configured to form a cleaning pad.

With reference to FIG. 23, a method of making an embodiment of a cleaning pad and a mechanism configured to form an embodiment of a cleaning pad are illustrated schematically. Three rolls of material are provided: a roll of attachment layer material with a porous abrasive substance applied to a surface thereof 450; a roll of core material 452; and a roll of cover layer material 454. Material is unwound from each roll, layered, and laminated at a lamination station 456.

In one embodiment, the layers are coupled together ultrasonically. In another embodiment, the layers are thermally coupled. In another embodiment, the layers are mechanically coupled. In another embodiment, the layers are coupled with adhesive. The coupled layers proceed to folding, cutting, saturating, and packaging stations 458.

In cleaning pads with scrubbing strips, such as, e.g., narrow thermoplastic strips coupled to the cleaning pads, an additional roll of thermoplastic material would be required, which may require an additional unwinding process and may require an additional process to couple the strip to a cleaning pad, which may increase unwinding processes, increase web handling, complicate web alignment, complicate complexity, and increase waste over the process illustrated in FIG. 23.

Portions of attachment layers with porous abrasive substances applied described herein generally have a porous, absorbent structure that is conducive to absorbing liquid and trapping dirt.

The Figures illustrate the exemplary embodiments in detail, and it should be understood that the present application is not limited to the details or methodology set forth in the description or illustrated in the Figures. It should also be understood that the terminology is for the purpose of description only and should not be regarded as limiting. Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings of the subject matter described herein. Other substitutions, modifications, changes and omissions may also be made in the design, operating conditions and arrangement of the various exemplary embodiments without departing from the scope of the present invention. While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

For purposes of this disclosure, "coupled" means the mechanical joining of two components directly or indirectly to one another. Such joining may be stationary in nature or moveable in nature. Such joining may be achieved with the two components and any additional intermediate members being integrally formed as a single unitary body with one another or the two components and any additional member being attached to one another. Such joining may be permanent in nature or alternatively be removable or releasable in nature.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Other substitutions, modifications, changes and omissions may also be made in the design, operating conditions and arrangement of the various exemplary embodiments without departing from the scope of the present invention.

What is claimed is:

1. A cleaning pad comprising:
   a cover layer;
   a core; and
   an attachment layer having a first side and a second side, the core being located between the cover layer and the second side of the attachment layer, the cover layer being coupled to the attachment layer, the attachment layer including wing portions each extending from the portions of the attachment layer coupled to the cover layer to a periphery of the attachment layer;
   wherein the pad includes a porous abrasive substance applied to generally all of the second side of each of the wing portions of the attachment layer.

2. The cleaning pad of claim 1, wherein the porous abrasive substance is applied to generally all of the second side of the attachment layer.

3. The cleaning pad of claim 1, wherein the attachment layer is configured to be coupled to a mop head such that the wings may be applied to a worksurface by placing either side surface of the mop or the top surface of the mop in contact with the worksurface.

4. The cleaning pad of claim 1, wherein the cleaning pad is configured such that the wings are fluid permeable.

5. The cleaning pad of claim 1, wherein the cleaning pad does not include a thermoplastic film coupled to the attachment layer.

6. The cleaning pad of claim 1, wherein the porous abrasive substance is a different color than the core and the cover layer.

7. The cleaning pad of claim 1, wherein the core extends a first width;
   wherein the portion of the surface of the attachment layer that has the porous abrasive substance applied thereto extends a second width; and
   wherein the second width is greater than the first width.

8. A method of making a cleaning pad comprising:
   providing an attachment layer having a first side and a second side;
   providing a core;
   providing a cover layer; and
   coupling the cover layer to the attachment layer, with the core located between the cover layer and the second side of the attachment layer;
   coupling the cover layer to the attachment layer forming wing portions, each wing portion extending from the portions of the attachment layer coupled to the cover layer to a periphery of the attachment layer; and
   applying a porous abrasive substance to generally all of the second side of the portions of the attachment layer forming each of the wing portions.

9. The method of claim 8, wherein the abrasive substance is one of fibers between 2 denier and 200 denier, meltblown polymer globules, thermoplastic fibers, powder bonding resin, and hard polymeric compound.

10. The method of claim 8, wherein the step of applying a porous abrasive substance includes flame impingement treatment of thermoplastic fibers.

11. The method of claim 8, wherein the cover layer is coupled to a portion of the second side of the attachment layer to which the abrasive substance has been applied.

* * * * *